US 6,704,993 B2

(12) United States Patent
Fogarty

(10) Patent No.: US 6,704,993 B2
(45) Date of Patent: Mar. 16, 2004

(54) COMBINED DELTA-WYE ARMATURE WINDING FOR SYNCHRONOUS GENERATORS AND METHOD

(75) Inventor: James Michael Fogarty, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/035,249

(22) Filed: Jan. 4, 2002

(65) Prior Publication Data

US 2002/0057030 A1 May 16, 2002

Related U.S. Application Data

(62) Division of application No. 09/671,124, filed on Sep. 28, 2000, now Pat. No. 6,455,974.

(51) Int. Cl.[7] ................................................. H02K 15/14
(52) U.S. Cl. ............................ 29/596; 29/598; 310/184
(58) Field of Search ........................... 29/596, 598, 605, 29/606; 310/184, 198

(56) References Cited

U.S. PATENT DOCUMENTS 5,760,567 A * 6/1998 Nakamura et al. .......... 318/777

* cited by examiner

Primary Examiner—Thanh Lam
(74) Attorney, Agent, or Firm—Nixon & Vanderhye, P.C.

(57) ABSTRACT

A polyphase electric generator (10) is disclosed having a fixed output voltage configurable to virtually any voltage level within a certain range of voltages. The armature winding (18) of the generator is arranged in a combined Delta and Wye topology (60, 66). Each phase winding (20, 54) in the armature is partitioned into first and second sections of the phase winding (56, 58). The first sections (56, 62, 64) of each of the phase windings are arranged together in a Delta topology (60). Each of the second sections of each phase winding is arranged in a Wye topology (66) with a pair of the first winding sections. Each of the second sections (58) are connected at one end to a node (68) of the Delta topology where two of the first winding sections are connected. The opposite ends (70) of the second sections of each phase winding are connected to output terminals (26) of the armature to provide a line-to-line voltage output. The line-to-line output voltage (30) of the generator is dependent on the voltage across each winding phase (24) and the proportion of each phase winding arranged in a Delta topology.

6 Claims, 5 Drawing Sheets

100% DELTA
VLL=100%

75% DELTA
VLL=122%

50% DELTA
VLL=141%

0% DELTA
VLL=173.2%

COMBINED DELTA-WYE ARMATURE WINDING FOR SYNCHRONOUS GENERATORS AND METHOD

This application is a divisional of application Ser. No. 09/671,124, filed Sep. 28, 2000, now U.S. Pat. No. 6,455,974, issued Sep. 24, 2002.

BACKGROUND OF THE INVENTION

The present invention relates to polyphase electrical generators having armature windings connected in various configurations to provide desired output voltage levels. In one embodiment, the present invention relates to a method and apparatus for providing a fine voltage adjustment for the fixed output voltage of a polyphase electric generator for utility and industrial applications.

Conventional utility and industrial electric power generators produce voltages normally between 10.5 kilovolts (kV) to 28 kV. The voltage levels produced by these generators are stepped up by transformers to transmission line voltage levels, typically 40 kV to 400 kV. High voltage generators that directly generate voltages at transmission line voltage levels are becoming increasingly common. These high voltage level generators avoid the need for the step-up transformers and other power distribution components normally associated with converting the lower voltages generated by conventional generators to transmission line voltage levels.

As high voltage generators become more common, the need for step-up transformers may become less and there may be power generation sites at which the step-up transformers are not readily available. However, the same power generation sites employing increasing numbers of high voltage generators often continue to operate conventional low voltage generators. Accordingly, there is a need for a technique for modifying low voltage generators to generate electric power at high voltage transmission line levels.

There is a further need for utility generators that produce electric power at various fixed voltages. Each utility power facility must produce electric power at one or more fixed voltage levels to suit the power transmission line requirements for that power system. These voltage levels are dictated by the requirements of the electric transmission utility and the customary voltages used in the country of the utility. In the United States, typical transmission line voltage levels are 230 kV, 345 kV and 765 kV. Several other countries tend to set transmission line voltages at 400 kV. In Japan transmission line voltages are as high as 1,000 kV. Each power utility will produce electric power at the one transmission line voltage level (and in certain sites at multiple levels) for use in the power distribution grid to which the utility is connected.

Electric generating systems produce power that is at or can be converted to the voltage level required at a particular power utility site. Utility power generation systems are extremely large industrial products that are usually sold worldwide. It is desirable that power generation systems be convertible to match power generation requirements, such as transmission line voltage levels, for various utility and industrial sites throughout the world. In particular, it is desirable that power generation systems, in the United States, be configured to match transmission line voltages of 230 kV, 345 kV and/or 765 kV, and configured in other countries to match the transmission line voltage levels used in those countries.

Generators have historically not been designed to produce electric power at the specific voltage levels of the various power line transmission level requirements. Step-up transformers converted the output voltage levels of generators to transmission line voltage levels. Because of step-up transformers, the generators were not required to produce a variety of output voltages corresponding to the voltage level requirements of each electric power utility distribution grid. The generator need only produce a fixed voltage. Standard voltages for conventional (low voltage) generators are 13.8 kV or 18 kV. These voltages are too low to be applied to power transmission lines. The output voltage of the generator was converted by transformers to transmission line voltage levels.

The voltages produced by the conventional low voltage generators were increased through the use of generator step-up transformers (GSU) to match the generated voltage to the power transmission line voltages. The manufacturers have adapted GSU transformers to match any given generator voltage rating and power transmission line voltage requirements. Accordingly, it has been the responsibility of the transformer manufacturers to provide the necessary selection of fixed voltage levels when connecting generators to particular applications, specifically transmission lines.

Aggressive marketing of high voltage generators has threaten to substantially reduce and possibly eliminate the need for the generator set-up transformers (GSUs). Without GSUs the generators must produce the various fixed output voltages needed to match the various requirements of transmission lines and other generator applications. Accordingly, there is a need for generators having output voltage levels that can be converted to match the various fixed voltage level requirements of electric power transmission lines and other generator applications.

Traditionally, when faced with new generator output voltage requirements, generator manufacturers have redesigned the electromagnetic and mechanical portions of the generator. For example, the manufacturers redesigned the number of winding turns in the armature coils, changed the coils themselves and/or changed the number of stator slots in the generator. A generator redesign would typically involve modifications to the entire character of the machine, including the electrical and mechanical design features. Redesigning generators in this manner is an expensive, long-term and economically-risky program. Designing new generators and redesigning existing generators to match each of the different transmission voltage level requirements would be extremely expensive, burdensome and time-consuming for generator manufacturers.

There is a need for generators that can be easily configured for various fixed voltage output requirements, without having to redesign the entire electrical and mechanical nature of the generator machine. Such generators would allow a manufacturer to make a few standard generator models, and configure each individual generator to a particular customer's requirements without having to substantially redesign the generator. The economies offered by reducing the variety of generator models offered by an individual manufacturer are tremendous. These advantages include reduced engineering time in designing generators, reduced manufacturing time by having fewer production lines, minimizing spare parts manufacturer, and minimizing need for maintaining and training surface personnel on a large variety of generators.

It is well-known to connect the armature windings of a generator in a Delta or Wye topologies to provide a limited selection of fixed voltage outputs. A conventional Delta topology configuration is shown in FIG. 2 and a conventional Wye topology configuration is shown in FIGS. 3 and 4. These winding topologies allow a generator to operate at a few discrete voltage levels. For example, a three-phase generator may produce voltages at a 100% phase winding voltage level in a Delta configuration and at a 173% phase winding voltage level when in a Wye configuration.

Delta and Wye topologies may each be combined with parallel and series winding arrangements as is shown in FIGS. 5 and 6 to produce voltage level steps of 100% (Delta), 173% (Wye), 200% (Delta), 300% (Delta), 346% (Wye), and so on. These voltage level steps are still separated by relatively large differences. The conventional Delta and Wye configurations did not allow for the selection of voltages that are not at one of these voltage level steps. Conventional Delta, Wye and Delta-Wye combination winding topologies do not allow for fine generator output voltage selections. Thus, a difficulty with these known armature topologies is that they do not allow fine voltage selection and are limited to varying the voltage in certain large steps.

The large voltage steps provided by the Delta and Wye topologies do not allow a generator to be configured to meet an output voltage level requirements that does not correspond to the levels offered by traditional Delta and Wye topologies. There is a need for a fine adjustment of the voltage level output for a utility or industrial generators. A fine adjustment of voltage levels would allow generators to be configured to match a wide variety of voltage level requirements, such as the levels matching transmission lines.

SUMMARY OF THE INVENTION

A synchronous generator has been developed having fine adjustment of its voltage level output. The generator may be configured to produce a selected output voltage level at substantially any voltage level within a wide range of available voltages. The voltage level for the generator is set by the arrangement of connections of the end turns of the armature windings of the generator. Once the connections of the armature windings have been set, the generator produces a fixed generated phase voltage that remains constant.

The fine voltage adjustment is provided through a variety of connections between the winding turns of the armature of the generator. These connections between the armature windings are relatively easy to configure because they are essentially external to the main components of the generator, and do not require internal reconfiguration of the generator. By properly connecting the winding turns of the armature, substantially any desired output voltage level can be obtained from the generator within a certain range of available voltages. The ability to select any output voltage level by establishing connections of armature winding turns provides an economical technique for customizing utility and industrial generators for specific voltage level requirements.

The current configurable generator enables a manufacturer to produce a standard generator having uniform arrangements of stator cores, slots, windings and other electromagnetic components. This standard generator is configurable to produce a fixed output voltage from a wide range of available voltages. Because of the technique of configuring connections between windings, substantially any voltage within the range can be selected. This technique provides for fine, incremental steps of voltages along the range of available voltages to be selected by a generator customer. Accordingly, a generator manufacturer may customize each generator to suit a particular customer's requirement for an output voltage level. The manufacturer may adapt each generator to suit the customer voltage requirement by configuring the interconnections between the winding turns. The manufacturer is spared the expense of having to substantially redesign or reconfigure the internal operating components of the generator.

DETAILED DESCRIPTION OF THE DRAWINGS

Figure 1:
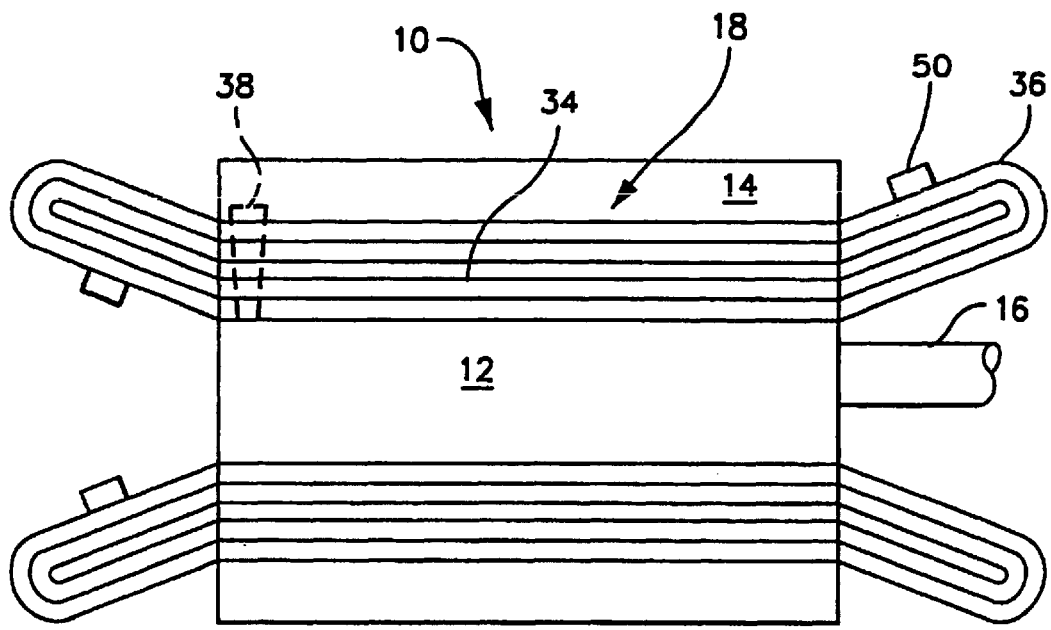
FIG. 1 schematically shows a generator having a stator with windings and winding turns.

FIG. 1 shows a polyphase electrical generator 10. The generator has a cylindrical rotor 12 surrounded by an annular stator 14. The rotor is on a rotating shaft 16 that may be driven by a gas turbine, steam turbine or other drive mechanism. A conventional construction of polyphase electrical generators and other machines is to use two or more electrical winding phase arranged to produce voltage waveforms that are identical except in phase. Other typical arrangements of electrical windings are six, nine and twelve phases, although substantially any number of phases is possible. In a conventional three-phase generator, th voltages and currents from each of phase winding circuits are identical, but offset by a 120 degree time phase difference. The embodiment disclosed here is a three phase synchronous generator 10, but the invention is applicable to all polyphase electrical machines in which the number of electrical phases in a multiple of three, e.g., 3, 6, 9, an so on. Moreover, the invention may be adapted to polyphase electrical machines having number of electrical phases that are not a multiple of three, such as 4, 5, 7, and so on.

Figure 2:
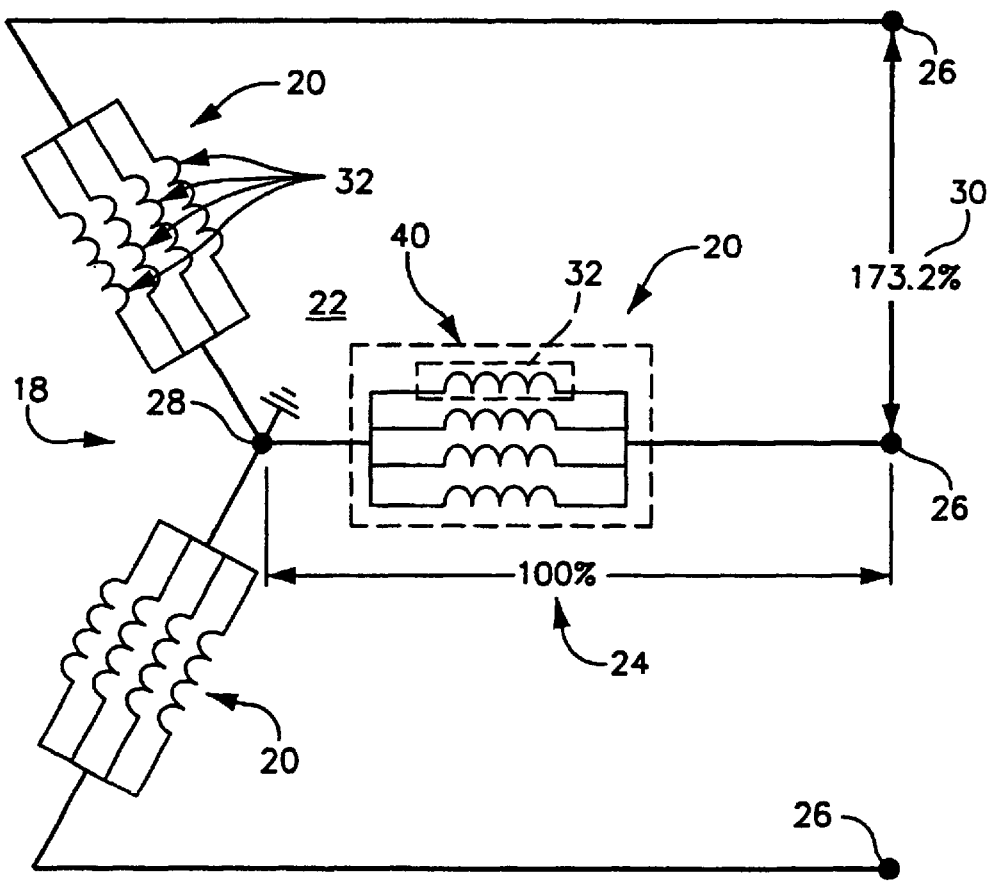
FIG. 2 is a schematic representation of a three-phase winding using four parallel circuits in a conventional "Wye" winding connection topology.

FIG. 2 shows the armature winding 18 of a polyphase having (n) individual phase winding circuits 20, such as where n equals three phases, that are coupled together in a conventional Wye (also known as a "star") winding topology 22. The voltage in each phase winding circuit 20 is the phase voltage 24, which is used here as a baseline 100% voltage level. The armature winding has an output terminal 26 at one end of each of the phase winding circuits. The opposite ends of the phase winding circuits are connected together at a central node 28 of the Wye topology. In a Wye topology, the line-to-line voltage 30 across the output terminals 26 of any two of the phase winding circuits 20 is 173.2% (square root of 3) of the phase voltage 24 in any one phase winding circuit 20.

The phase winding circuits 20 may each be formed from a group(s) of winding circuit segments 32. These segments include a portion of a winding, such as a pair of winding bars or winding cable sections 34 and an end turn 36 connecting the bars or cable sections in the segment. The winding bars or cable sections may be positioned in stator slots 38 of the stator 14, in a conventional manner. The winding segments may be formed by tapping selected end turns of the winding circuits 20 to form a desired arrangement of winding segments, such as the parallel arrangement 40 of a group of winding segments 32 shown in FIG. 2.

Figure 3:
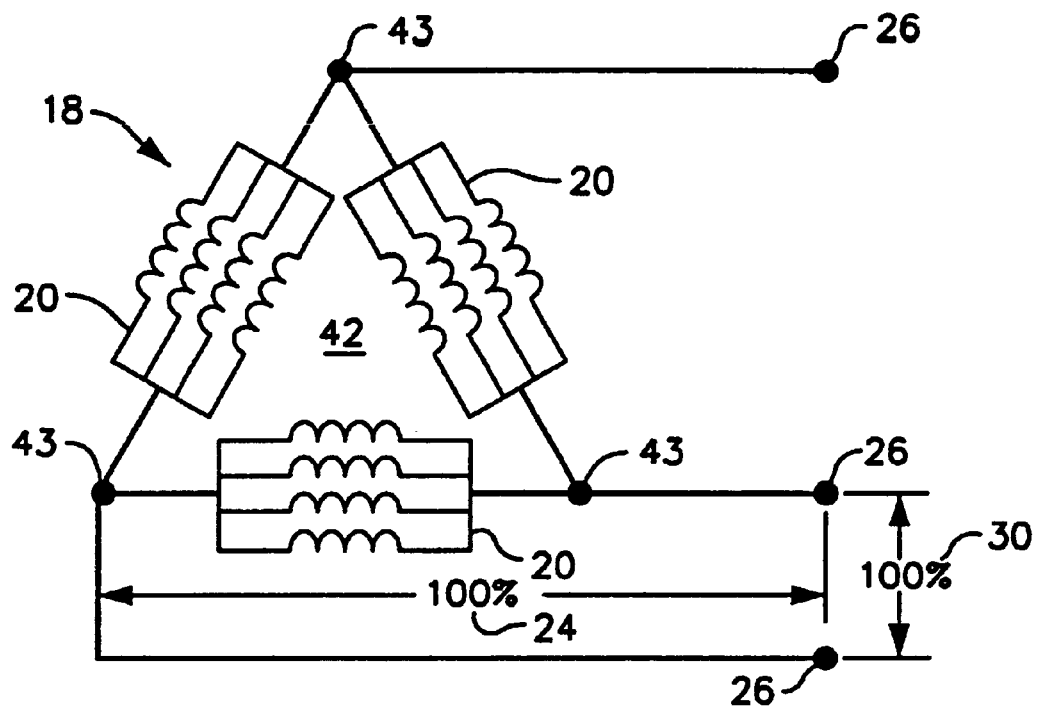
FIG. 3 is a schematic representation of a three-phase winding using four parallel circuits in a conventional "Delta" winding configuration topology.
Figure 4:
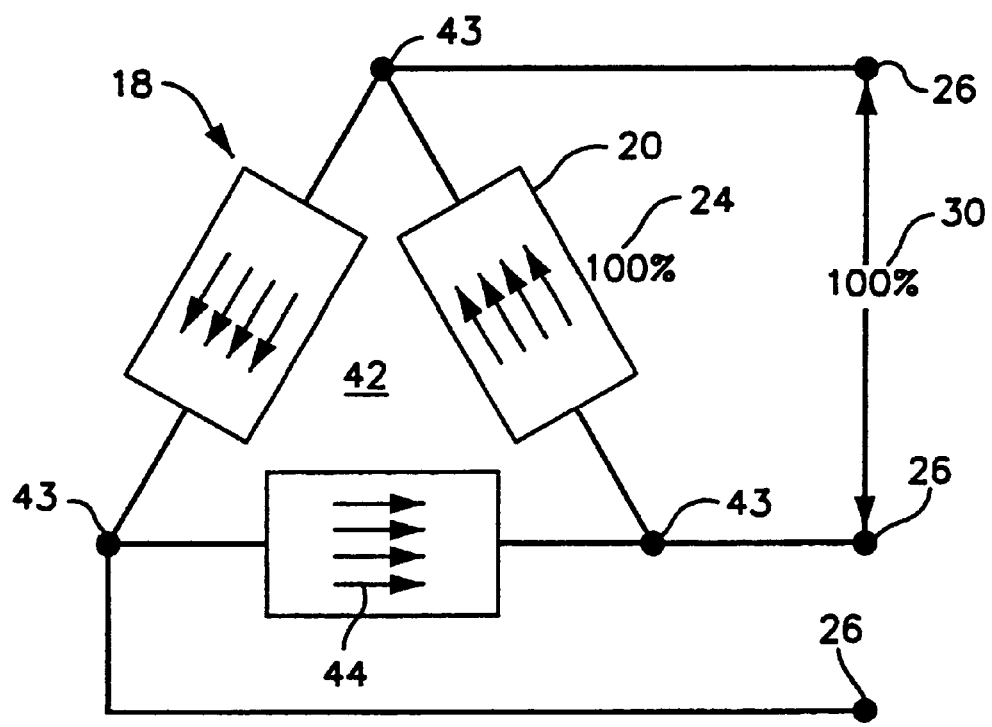
FIG. 4 is substantially similar to FIG. 2, but the illustration of the physical windings in FIG. 2 has been replaced by phasor symbols in FIG. 4.

FIG. 3 shows the armature windings 18 of a generator where the phase winding circuits 20 are arranged conventional Delta (Δ) 42 winding topology. The ends of each of the phase winding circuits 20 are connected at a node 43 to an armature output terminal 26 and to another end of a winding circuit 20 of another phase of the armature. In the Delta topology, the line-to-line voltage 30 is the same as the phase voltage 24 across of each phase winding circuit 20. FIG. 4 illustrates the same Delta winding topology 42 as in FIG. 3, but represents the winding segment circuits 24 as phasors 44 having a length proportional to the voltage across the phase winding circuit 20 and a phasor direction (angle) equal to the phase angle of the voltage in the phase winding circuit 20.

Figure 5:
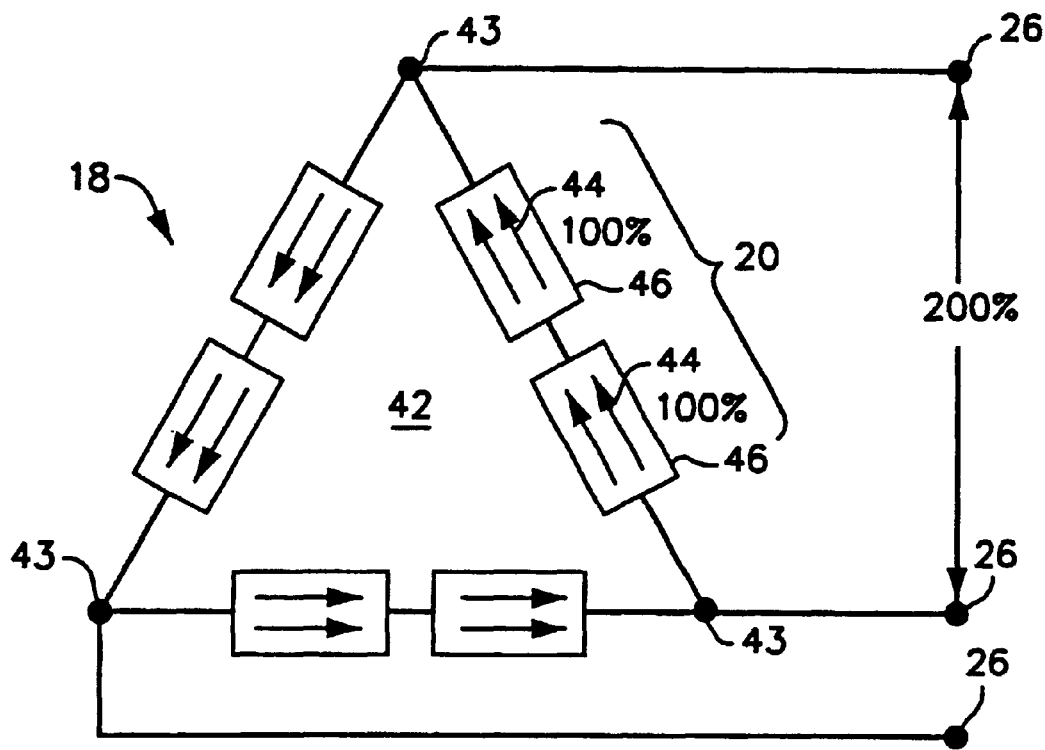
FIG. 5 is a three-phase winding generator in which each phase has two parallel pairs of circuits arranged in series late and all are arranged in a "Wye" topology.

FIG. 5 illustrates a Delta winding topology 42 in which each phase winding circuit 20 is arranged as two pairs 46 of parallel winding segments 32. The pairs 46 of winding segments are connected in series. The phase windings 20 are arranged in a Delta topology 42. While the overall connection topology is a Delta configuration, the winding segments 46 within each phase winding 20 are connected in series and parallel to provide a resulting line-to-line output voltage 26 of 200% of the phase voltage (100%) 48 in each winding segment 44.

Figure 6:
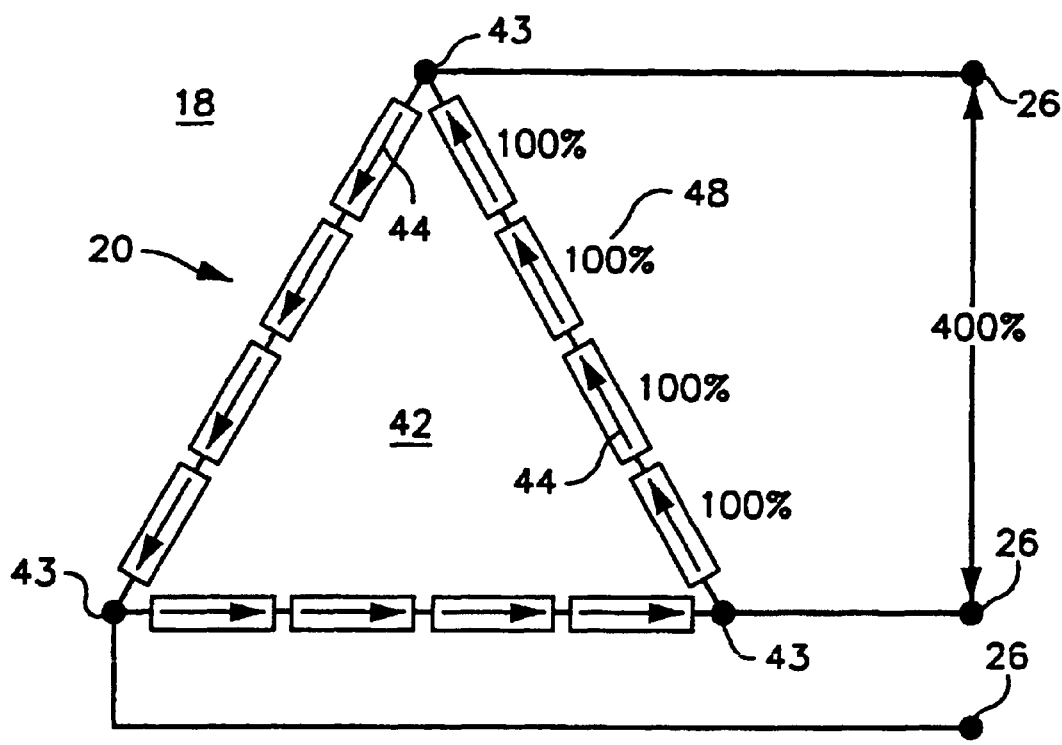
FIG. 6 is a phasor diagram of a three-phase winding having four series circuits connected in a Wye topology.

FIG. 6 schematically illustrates individual winding segment 44 connected in series to form a phase winding circuit 20. The phase windings 20 are arranged in a Delta topology 42. Each winding circuit segment may be a single turn of a winding in a stator. A circuit tap 50 (FIG. 1) at selected end turns 36 of the armature winding provides an electrical connection to each winding circuit segment 44.

Figure 7:
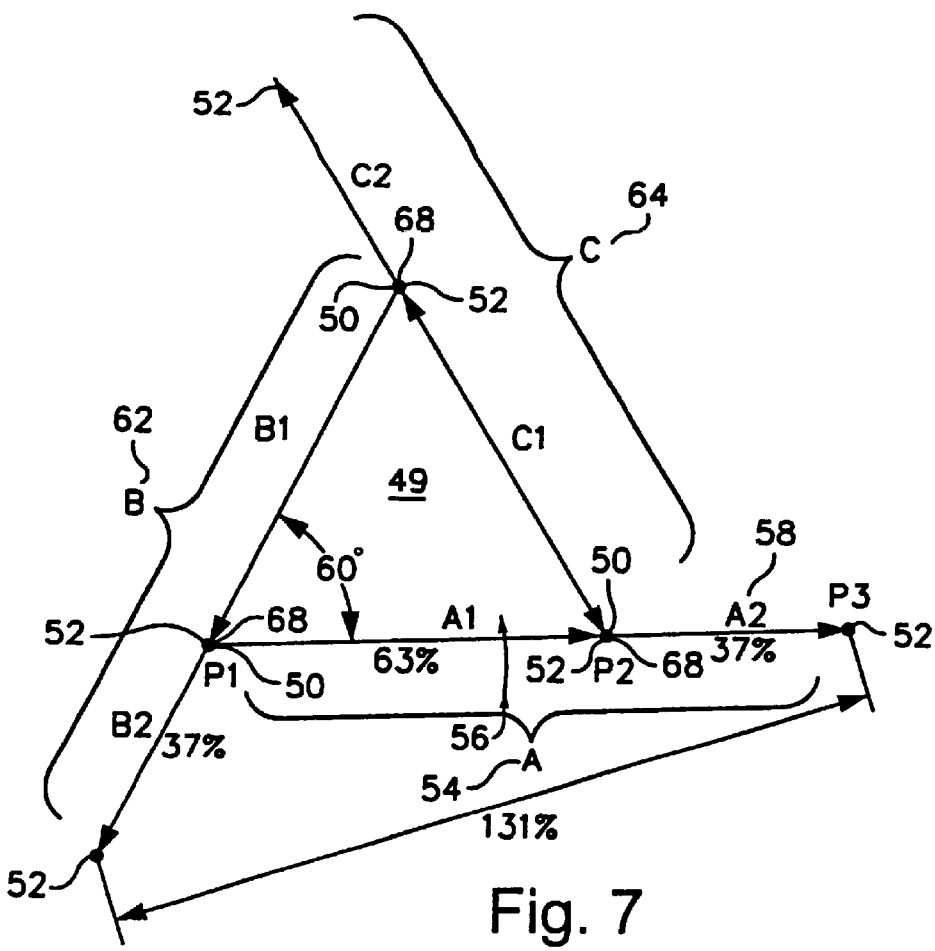
FIG. 7 shows a phasor diagram illustrating an exemplary combination Delta-Wye connection for a three-phase winding.

FIG. 7 is a diagram of the Delta winding arrangement shown in FIG. 6 where each single phase winding circuit 20 may comprise a series of winding circuit segments 32 (44). Each winding segment 44 passes axially through a respective stator slot(s) 38 (FIG. 1) and extends out the axial end(s) of the stator where a winding end turn 36 connects each winding segment to another winding segment in another slot. Multiple winding segments 44 are arranged in the stator slots 38, and each segment is connected by end turns 36 to other segments in other slots. These multiple winding segments and interconnecting end turns are conventionally connected to form a complete phase winding 20 for one phase of a polyphase armature. Conventional low-voltage generators have several tens of winding segments and end turns in each phase winding circuit. It is anticipated that high voltage generators will have one-hundred or more end-turns and associated winding segments in each phase winding circuit.

The armature winding phases (A, B and C, for example) of the generator are connected together to provide a power output to the generator. Conventionally, the ends of the winding phases are connected end to end (across end terminals) in either the Delta or Wye topologies or a combination of the two topologies. However, as shown in FIG. 7, each phase winding may be partitioned into two (or more) groups of winding segments, such as winding segment groups A1 and A2 of phase A54; groups B1 and B2 of phase B62 and groups C1 and C2 of phase C64. Connecting the high voltage winding segment portions (A1, B1 and C1) together a mini-Delta topology 60 is formed within the armature winding. The low voltage portions of winding segments (A2, B2 and C2) are each attached at one end 52 to a terminal tap 50 which is also a node of the Delta configuration, to form a Wye configuration 66 centered on each node 50. The opposite end of each of these winding portions serves as the output terminals 26 of the armature windings for the entire generator. As shown in FIG. 7, the windings are configured in a hybrid Delta and Wye configuration by interconnection certain portions of each winding in a Delta configuration and connecting other portions of the windings in a Wye configuration.

The end turns 36 provide a ready-made point at which electrical connection may be made to tap a mid-winding portion of a phase winding circuit. The end turns are easily accessible as they extend outside of the stator body 14, and allow connections 50 to be made to the mid-winding portion with relative ease. The phase windings 20 have two end terminals 52 at opposite ends of the winding, terminal taps 50 may be connected to selected winding end turns to extract electric power from only a portion of the winding. A terminal tap 50 may provide a connection to any one or more of the end turns 36 in a phase winding 20.

By tapping the phase winding 20 at a selected end turn(s) 50, the phase winding is partitioned into two or more winding segments. For example, a winding segment for phase A54 of a three phase generator (having phases A, B62 and C64) may divided into winding segments A1 56 and portion A2 58. A terminal tap 50 at a selected end turn partitions the phase A winding 54 into the A1 portion 56 of the winding segments, and A2 portion 58. The A1 winding portion 56 may be high-voltage portion of the phase A winding, extending between the terminal tap 50 and an end terminal 52 of the phase A winding. Similarly, the A2 winding portion 58 may be the low-voltage portion 58 of the phase A winding 54 between the terminal tap 50 and the other end terminal 52. The terminal tap 50 that partitions one phase winding, e.g., phase A, is connected to the end 52 of another phase winding circuit, e.g. phase B. The connections between the end turn tap 50 and the end 52 of a phase winding forms a mini-Delta topology circuit 60 formed by the winding segments A1. B1 and C1. The other segments (A2, B2, C2) of each winding phase are connected between a respective terminal tap 50 and an output terminal 26 of the armature. The terminal tap 50 thus becomes a center node of a mini-Wye topology 66 formed by segments A1, A2 and C1, for example.

In the example shown in FIG. 7, the winding portion A1 56 represents 63% of the phase A winding, and winding portion A2 58 represents the remaining 37% of the total phase A winding 54. Similarly, winding phases B and C are divided exactly in the same 63%–37% manner as is the phase winding. The high voltage portion of phase A1 is connected to the low voltage portion of phase C62 at point B2 (a terminal tap 50) in each winding. The low voltage end of base A1 is connected to phase B at B2. The line-to-line voltage of the armature winding is a resulting sum of the voltages on phase A1, A2 and B2. In the hybrid Delta-Wye configuration shown in FIG. 7, the 100% contribution of phase A, and the 37% of phase B result in a total line-to-line voltage that is 131% of the phase voltage, after the phase angles of phase A and B are taken into account. This same 131% magnitude voltage is produced by the combination of the other two phases (100% of C plus 37% from A2, 100% of B plus 37% C2) in the armature winding. The three resulting line-to-line phase voltages are equal in magnitude and displaced in time by 120% degree, as is conventional for a three-phase machine. The 131% line-to-line voltage level is a level that is not available in conventional generators connected in either the Delta or Wye configurations.

Figure 8:
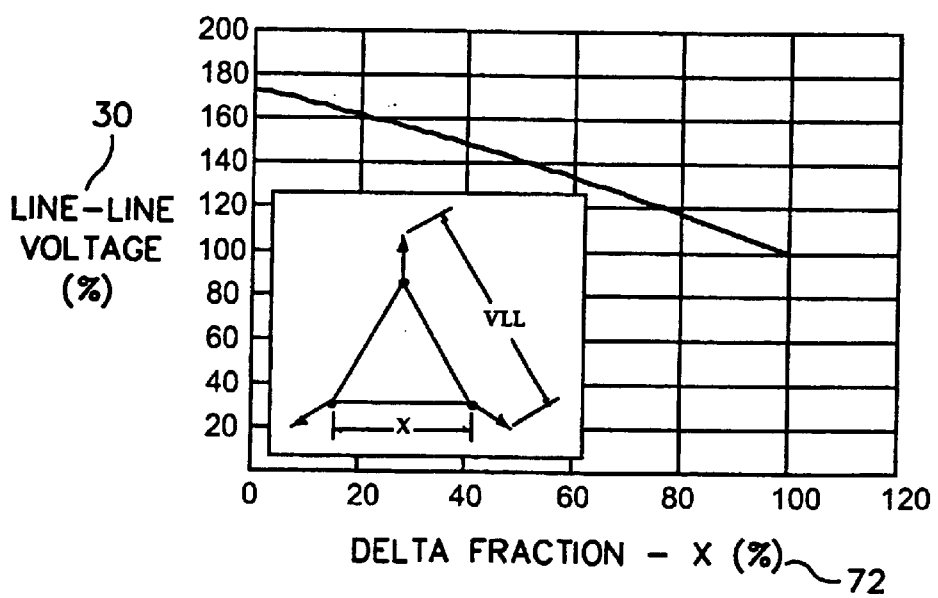
FIG. 8 shows a chart of line-to-line generator output voltage as a function of the fraction of the armature winding configured in a Delta topology.

FIG. 8 is a chart showing a relationship between the line-to-line voltage 30 of an output to a polyphase generator to the fraction 72 of the phase windings that are arranged in a Delta topology. The line-to-line voltage ($V_{LL}$) is a percentage of the voltage across an entire phase winding, such as the phase A winding. The fraction of the phase winding that is not in a Delta topology is arranged in a Wye topology in the manner shown in FIG. 7. As is evident from the chart, the line-to-line voltage may be set as a percentage of 173% to 100% of the phase winding voltage. The setting of the line-to-line voltage is a continuous function of the fraction of the phase winding in a Delta topology. This fraction can be adjusted by selecting which of the end turns of the phase winding are to be tapped for the Delta topology.

An equation (1) has been developed that correlates the line-to-line voltage of a generator to the proportion of the armature phase windings that are arranged in a Delta topology, where the rest of the windings are in a Wye topology. The equation is as follows:

$$V_{LL} = 2\left\{\mathrm{Sin}\left(\frac{X\pi}{6}\right) + \sqrt{3}\,\mathrm{Sin}\left(\frac{(1-X)\pi}{6}\right)\right\} \quad (1)$$

where: "$V_{LL}$" is the line-to-line voltage as a proportion of the phase winding voltage level, and;

"X" is the fraction of a phase winding in a Delta topology.

In another example, a three-phase utility generator having a fixed generated phase voltage of 80 kV may be configured to produce a selected output voltage at virtually any voltage within a range of 80 kV to 138 kV. This fine voltage adjustment is achieved by selectively connecting the armature windings that constitute the three phases of the generator. Moreover, these interconnections may be made at the winding turns which are essentially external to the machine. The connections of the armature windings need not require adjusting the internal electromagnetic configuration, such as number of stator coils stator core diameter and length and without modifying the mechanical design of the generator.

Figure 9:
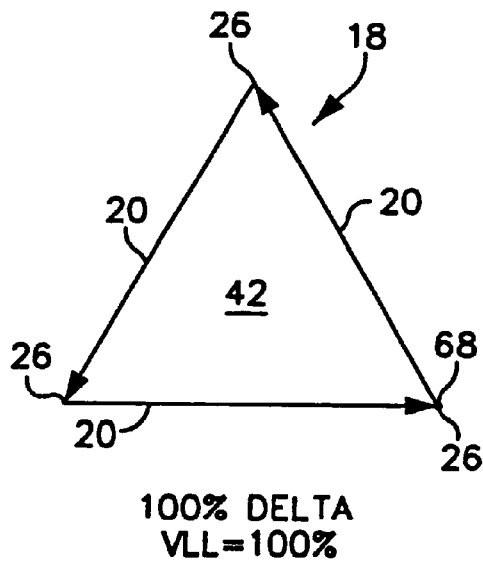
FIG. 9 is a phasor illustration showing a three-phase winding in a 100% Delta topology configuration.
Figure 10:
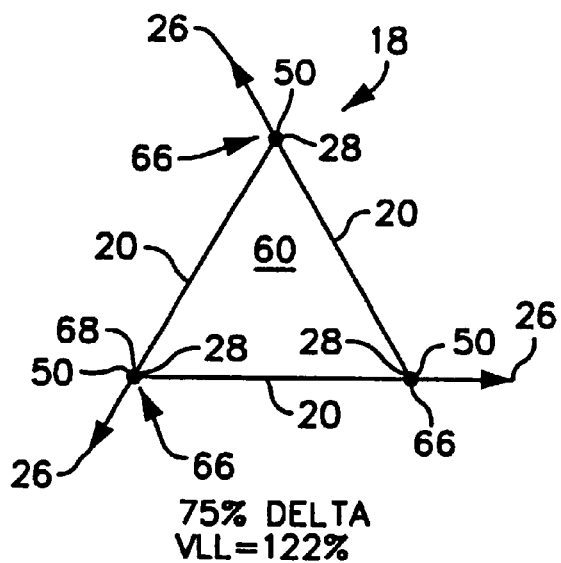
FIG. 10 is a phasor representation showing a three-phase winding that is connected in a configuration having a 75% Delta topology and a 25% Wye topology.

FIGS. 9, 10, 11 and 12 illustrate alternative winding topologies that can be configured using the hybrid Delta-Wye winding topology. In particular, FIG. 9 shows a conventional Delta topology in which each phase winding 20 is connected end-to-end to the ends of other phase windings. FIG. 10 shows another winding topology in which the phase windings 20 have been arranged by connecting end turn taps 50 of one phase winding to the end of other phase winding in order to form a mini-Delta topology 60. In addition, a mini-Wye topology 66 is formed using the end tap as a central node 28. The fraction of the inding that is in a Delta topology is 75%, based on the end tap 50 being located at an end turn that is at a position three-fourths (75%) the length of the phase winding. The line-to-line voltage ($V_{LL}$) for a 75% Delta winding topology is 122% of the phase voltage level.

Figure 11:
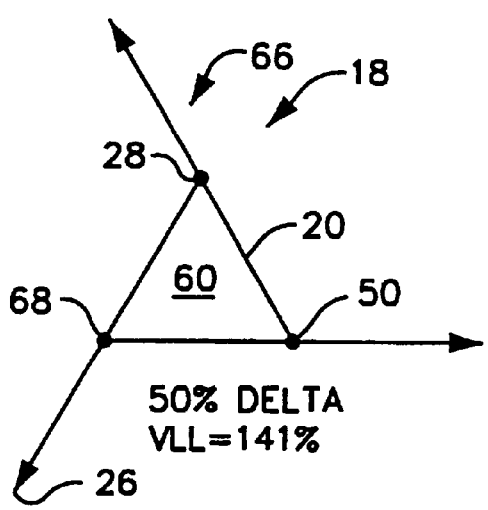
FIG. 11 is a phasor diagram showing a three-phase winding configured in a 50% Delta topology and a 50% Wye topology.
Figure 12:
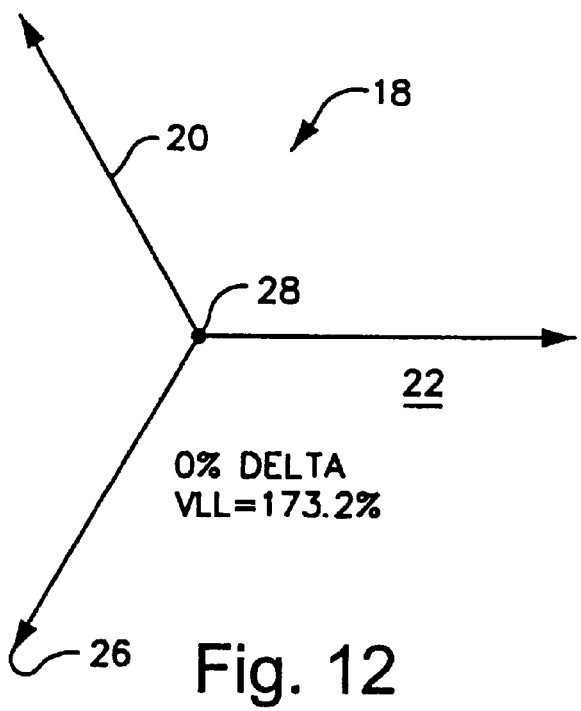
FIG. 12 is a phasor representation showing a three-phase winding configured in a 100% Wye topology, and having no Delta topology.

As shown in FIG. 11, the line-to-line voltage level is set at 141% of the phase voltage by configuring the winding topology such that one-half (50%) of each phase winding is arranged in a mini-Delta topology. The winding topology is reconfigured by tapping the end turns with a terminal tap to achieve the desired percentage of Delta topology for e armature winding. FIG. 12 shows a conventional Wye topology in which one end of each phase winding circuit 20 is connected to a common node and e opposite ends are connected to armature output terminals 26. Accordingly, FIGS. 9 to 12 illustrate that the output voltage level (as a percentage of the phase winding voltage level) of a polyphase generator can be set relatively at substantially any level thin a certain range (such as 100% to 173%) by configuring the armature winding as hybrid combination of Delta and Wye topologies. Moreover, the configuration of the winding topology is relatively easily set by selecting an appropriate winding end turn to tap that provides a prescribed Delta topology percentage to obtain the desired voltage level.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method or connecting armature windings in an electrical machine, wherein the armature windings include a plurality of phase windings, said method comprising:
   a. segmenting each of the plurality of phase windings into a first winding segment and a second winding segment by establishing a connection point at one of a plurality of available mid-winding connection points on each of said phase windings;
   b. at the established mid-winding connection point, connecting an end of the first winding segment in each phase winding to an end of the first winding segment in another of said phase windings to form Delta winding topology, and
   c. at the established mid-winding connection point, connecting a first end of one of said second winding segments to plurality of connected ends of said each of said first winding segments to form a Wye topology about each mid-winding connection point.

2. A method as in claim 1 wherein the available mid-winding connection points are at different end turns of the phase winding, and the established connection point is a contact tap at a selected end turn of the phase winding.

3. A method as in claim 1 wherein the first and second winding segments are in-phase.

4. A method as in claim 1 wherein an opposite end of said second winding segment is connected to an external terminal of said windings.

5. A method as in claim 1 where said plurality of phase windings include three phase windings, and each of said three phase windings has a plurality of established mid-winding connection points, and further comprising forming an external connection at an opposite end of each of the second winding segments to establish a three-phase power connection to the phase windings.

6. A method for connecting armature windings in an electrical machine, wherein the armature windings include a plurality of phase windings, said method comprising:

a. segmenting each of the plurality of phase windings into a first winding segment and a second winding segment by establishing a connection point at one of a plurality of available connection points said phase winding;
 b. at the established connection point, connecting an end of the first winding segment in each phase winding to an en of the first winding segment in another of said phase windings to form a Delta winding topology;
 c. at the established connection point, connecting a first end of one of said second winding segments to a plurality of connected ends of said each of said first winding segments to form a Wye topology about each connection point, and
 d. establishing a line-to-line output level ($V_{LL}$) between each of said phase windings in accordance with the following expression:

$$V_{LL} = |X e^{j\pi/6} + (1 - X)|$$

where: "$V_{LL}$" is the line-to-line voltage as a proportion of a phase winding voltage level;
"X" is a fraction of a phase winding arranged in a Delta topology, and
"j" is a complex operator, wherein $j^2 = -1$.

* * * * *

UNITED STATES PATENT AND TRADEMARK OFFICE
CERTIFICATE OF CORRECTION

PATENT NO. : 6,704,993 B2
DATED : March 16, 2004
INVENTOR(S) : Fogarty

It is certified that error appears in the above-identified patent and that said Letters Patent is hereby corrected as shown below:

Column 4,
Line 51, delete "winding phase" and insert -- winding phases --.
Line 55, delete "th" and insert -- the --.
Line 61, delete "an so on." and insert -- and so on. --.
Line 63, insert -- a -- between "having" and "number".

Column 7,
Line 2, insert -- A -- between "phase" and "winding".
Line 5, delete "base A1" and insert -- phase A1 --.
Line 62, insert -- 42 -- between "Delta topology" and "in".
Line 66, delete "other phase" and insert -- another phase --.

Column 8,
Line 2, delete "the inding" and insert -- the winding --.
Line 13, delete "e" and insert -- the --.
Line 15, insert -- 22 -- between "topology" and "in".
Line 16, delete "node and e" and insert -- node 28 and the --.
Line 21, delete "thin" and insert -- within --.
Line 22, insert -- a -- between "as" and "hybrid".
Line 36, delete "A method or" and insert -- A method for --.
Line 51, insert -- a -- between "to" and "plurality".

Column 9,
Line 9, insert -- on -- between "points" and "said".
Line 12, delete "an en" and insert -- an end --.

UNITED STATES PATENT AND TRADEMARK OFFICE
CERTIFICATE OF CORRECTION

PATENT NO.    : 6,704,993 B2
DATED         : March 16, 2004
INVENTOR(S)   : Fogarty It is certified that error appears in the above-identified patent and that said Letters Patent is hereby corrected as shown below:

Column 10,
Lines 6-9, delete "(1)  $V_{LL} = |Xe^{j\pi/6} + \sqrt{3}\,(1-X)|$"

and insert -- (1)  $V_{LL} = 2\left\{Sin\left(\dfrac{X\pi}{6}\right) + \sqrt{3}Sin\left(\dfrac{(1-X)\pi}{6}\right)\right\}$ --.

Line 11, insert -- and -- after "level;".
Lines 13-14, delete "topology, and "j" is a complex operator, wherein $j^2 = -1$." and insert -- topology. --

Signed and Sealed this

Tenth Day of May, 2005

JON W. DUDAS
*Director of the United States Patent and Trademark Office*